BEST AVAILABLE COPY

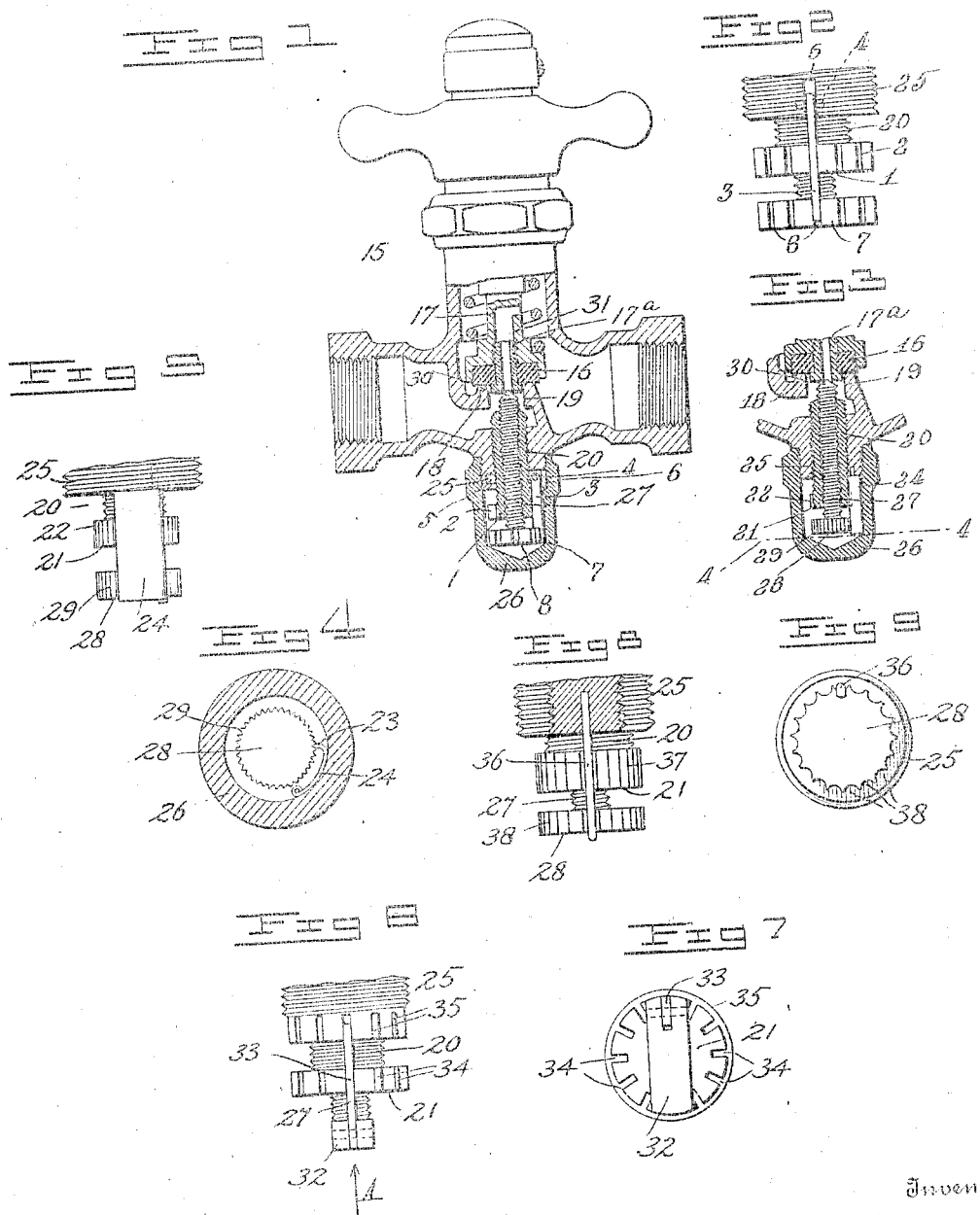

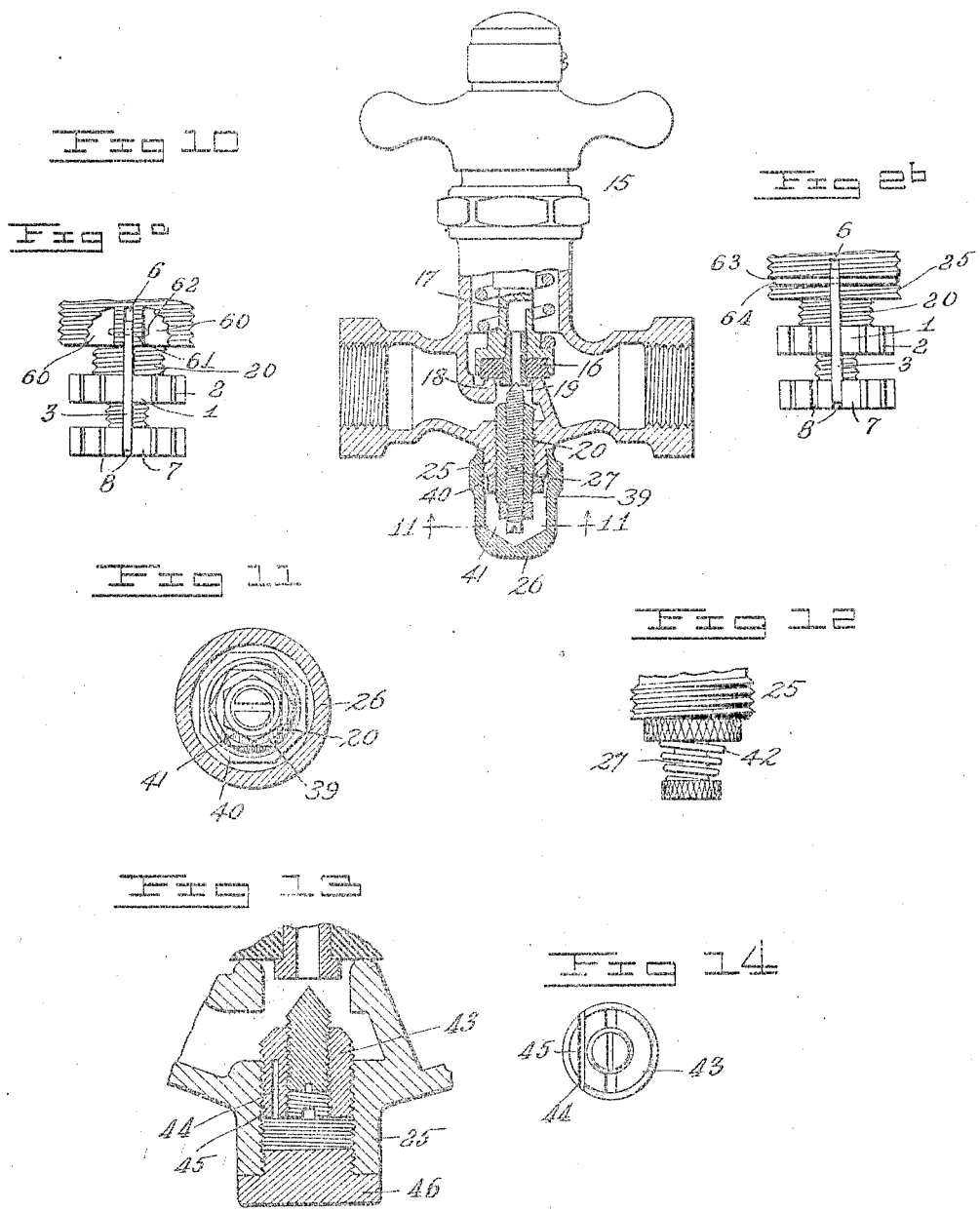

UNITED STATES PATENT OFFICE.

PHILIP MUELLER AND ANTON C. SCHUERMANN, OF DECATUR, ILLINOIS, ASSIGNORS TO H. MUELLER MFG. CO., OF DECATUR, ILLINOIS, A CORPORATION OF ILLINOIS.

DEVICE FOR CONTROLLING THE FLOW OF FLUID.

1,081,274.   Specification of Letters Patent.   Patented Dec. 9, 1913.

Application filed June 5, 1913.   Serial No. 771,984.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Devices for Controlling the Flow of Fluid, of which the following is a specification.

This invention relates to novel means for controlling the flow of fluid, and has for its object to provide means for regulating the service passage for the fluid through a pipe or conduit and containing also independent means for regulating the continuous flow of fluid through said pipe or conduit so that wherever the fluid is to be regulated for both service or continuous flow, or waste conditions, efficient and separately adjustable means for securing these results are furnished. These means are shown in the present embodiment of the invention in connection with a stop cock designed particularly for water distribution; the invention, however, is not limited to such use, but may be utilized wherever it is desired to control the flow of fluid in connection with any type of faucet or valve.

This invention is particularly valuable wherever a continuous flow of fluid through a pipe in a limited quantity is desired in connection with means for increasing the flow to service proportions at will, the volume of flow being accurately regulated by this device.

In the accompanying drawings: Figure 1 is a part elevation, part vertical section of a stop cock with the invention applied. Fig. 2 is an enlarged detail view of the preferred form of locking means for the adjustment devices which regulate the flow of fluid. Fig. 2ª is a similar view showing a slight modification in the attachment of the locking means. Fig. 2ᵇ is a similar view showing a further slight modification in the attachment of the locking means. Fig. 3 is a detail vertical section of a modified form of the locking means. Fig. 4 is an enlarged cross sectional view on the line 4—4 of Fig. 3. Fig. 5 is an enlarged detail view in elevation of a modified form of locking means. Fig. 6 is a similar view of another modified form of locking device. Fig. 7 is a view looking in the direction of the arrow A, Fig. 6. Figs. 8 and 9 are views similar to Figs. 6 and 7, respectively, of another modified form of locking device. Fig. 10 is a view similar to Fig. 1, illustrating a further modification of the locking device. Fig. 11 is an enlarged sectional view on the line 11—11 of Fig. 10. Figs. 12, 13 and 14 are detail views of other modified forms.

In the drawings 15 indicates a stop cock which may be of any type, provided with a closing valve 16 mounted on a stem 17, illustrated in the drawings as closing against a seat 18 extending across and dividing the cock body, and having a port 19 therethrough for the passage of the fluid. Screw threaded through the bottom of the stop cock body from without in the axial line of the port 19 is a screw-valve 20 slightly greater in diameter than said port, and adapted to move to and from the same when turned, thereby more or less reducing the area of said passage to limit the quantity of fluid passing therethrough under service conditions. The outer end of the plug 20 is provided with a head 1 having radial slots 2 on its periphery into which engages, in the preferred form of the invention illustrated in Figs. 1 and 2, the free lower end of a locking bar 3 hinged upon the sleeve 25 projecting down from the body of the cock 15. The bar 3 has at its upper end oppositely disposed and laterally extending pins 4 engaging in a recess 5 formed in the interior side of the wall of the sleeve 25 whereby to hingedly support the bar 3. Opening into the recess 5 is a slot 6 extending longitudinally in one side of the sleeve 25 and in which the upper end of the bar 3 freely swings.

In Fig. 2ª is shown another manner of securing the bar 3 to the sleeve 25. In this construction no recess 5 is made in the inner side of the wall of the sleeve 25, but the outer side of the sleeve 25 is provided with a notch 60 at each side of the slot 6 and spaced slightly therefrom forming spaced apart lugs 61 between the slot and the respective notches. The bar 3 is hinged at its inner end in the slot 6 upon a pin 62 passing through the bar 3 and through the lug 61.

In the slightly different form shown in Fig. 2ᵇ the sleeve 25 has no internal recess 5 as in Figs. 1 and 2, but has an annular exterior groove 63 bisecting the slot 6 and which receives a spring ring or pin 64 crossing the groove and passing through the inner end of the bar 3 to hingedly support the latter In the form of cock represented in Fig. 1 the sleeve 25 projects downwardly from the cock body through the center of which sleeve the screw valve 20 passes. The exterior of the sleeve 25 is threaded to receive a cap or thimble 26 which covers the slotted head 1 of the screw valve and the bar 3, and holds the bar in engagement with the slotted head. The cap also prevents any liquid, when the device is used to control such, which may leak past the screw valve, from dropping. The valve 20 may be made imperforate when a continuous flow of fluid is not desired, but when in addition a limited continuous flow becomes necessary, or is demanded, the plug 20 is perforated and threaded longitudinally for a threaded needle valve 27 provided on its outer end with a head 7 preferably of the same diameter as the head 1 on the valve 20, and similarly slotted at 8 to engage the locking bar 3, as shown. The inner end of the needle valve 27 is tapered as at 30 to regulate the flow of fluid through a port or by-pass 31 here shown running longitudinally through the washer screw 17ª and the valve stem 17 at the center of the valve where it opens into the port 19, back along the stem for a short distance, and then opening at the side into the body of the cock.

When the invention is applied to a cock as represented in the drawings, the cap or thimble 26 is removed when adjustment is desired, and the locking bar 3 swung out from the slotted heads of the screw-valve 20 and threaded needle valve 27, and the screw valve turned to the right or left until, with the valve 16 open, the desired amount of fluid flows through the cock. The valve is then closed, and the needle valve 27 turned to adjust the continuous flow of fluid to the quantity desired. After the adjustment is had the bar 3 is swung into engagement with the slotted peripheries 2 and 8 of the heads of the two valves, and the cap 26 screwed into place. A more or less limited flow of fluid will now pass continuously through the stop cock by way of the by-pass 31 through the washer screw 17ª and the valve stem 17 and port 19 covered by the valve 16, escaping between the tapered end of the needle-valve 27 and the lower end of the by-pass 31. This flow may be augmented when desired to full service volume by raising the valve 16 from its seat 18, and opening to its full extent the port 19, the fluid passing through said port being checked and reduced by interference of the screw valve 20.

In the modified form, illustrated in Figs. 3, 4 and 5, the outer end of the screw valve 20 is provided with a head 21, toothed on its periphery at 22 with which the free inwardly turned edge 23 of the leaf pawl 24 engages, said leaf pawl being pivotally mounted on the bottom of the sleeve 25. The needle valve 27, which is threaded into the screw valve 20, has on its outer end a head 28 preferably of the same diameter as the head 21 on the valve 20, and similarly toothed at 29 to engage the leaf pawl 24, as shown. The cap or thimble 26 is, in a like manner as shown in Fig. 1, threaded on the sleeve 25 and engages against the pawl 24 to hold it against the heads of the valves.

Instead of using a leaf pawl 24 for locking the screw valve 20 and needle valve 27, the lower end of the needle valve may be made with a T or cross head 32 (see Figs. 6 and 7), and on one arm thereof pivot a finger 33. The head 21 of the screw valve is made in this instance with a number of radial slots 34 in its periphery, while like slots 35 are formed in the lower end of the sleeve 25. Into these slots 34 and 35 the finger 33 is adapted to engage in the manner shown in Fig. 6, and hold both the screw valve 20 and needle valve 27 from turning.

In Figs. 8 and 9 a spring pin 36 is secured in the lower end of the sleeve 25 and projects downwardly into engagement with the serrated peripheries 37 and 38 respectively of the heads of the screw valve 20 and needle valve 27. It is only necessary to press outwardly on the lower end of the spring pin 36 to release the heads 21 and 28 when the valves may be turned Figs. 10 and 11 show the screw valve 20 with a polygonal outer end 39 by means of which the screw valve is turned, and a lock nut 40 on the valve 20 screwed against the bottom of the sleeve 25 to prevent rotation of the screw-valve. A second lock nut 41 on the needle valve 27 keeps this member from turning.

Another means for holding the needle valve 27 against rotation is illustrated in Fig. 12, where a spiral or coiled spring 42 surrounds the outer end of the needle valve and bears at its ends against the heads of both the screw valve and the needle valve. The spring is made quite strong, and exerts sufficient force to hold the needle valve against rotation.

Figs. 13 and 14 illustrate another means for keeping the screw valve in position. In this instance both of the valves are made shorter than heretofore, the outer end of the screw valve 43 having a saw-kerf 44 cut in its end to form a spring tongue 45, which, when the plug is screwed into the cock body, bears with sufficient force against the side of the threaded opening into which it enters to prevent it from turning. Instead of a cap or thimble on the sleeve 25, a screw 46 follows the plug in the sleeve, and forms a finish for its lower end, at the same time preventing any liquid dripping from the cock which may escape past the plug or stem.

What we claim is:

1. The combination with a valve, of adjustable means independent of said valve for regulating the flow of fluid past said valve when open, separate adjustable means for regulating a constant flow of fluid past said valve when seated, and a common means for locking both regulating means in adjusted position.

2. A stop cock formed with a port and containing a valve for controlling said port, combined with an adjustable valve in the cock to choke said port, and a second adjustable valve within said first adjustable valve to further choke said port.

3. A stop-cock formed with a port and a valve for controlling said port having a by-pass therethrough, combined with an adjustable valve to choke said port, and a second adjustable valve carried by said first adjustable valve to control said by-pass.

4. A stop-cock formed with a port and a valve for controlling said port having a by-pass therethrough, combined with a screw-valve threaded in the body of the cock to choke said port, a needle valve within said screw valve to control said by-pass, and means on said body detachably engaging said screw and needle valves for locking the same in different points of adjustment.

5. A stop-cock formed with a port and containing a valve for controlling said port, combined with an adjustable screw valve threaded into the cock adapted to choke the flow of a stream through said port, a by-pass through the first mentioned valve opening at one end into said port, an adjustable needle valve threaded longitudinally in said screw valve to regulate the flow of a continuous stream through said by-pass, and means for locking the valves in adjusted position.

6. A stop-cock formed with a port and containing a valve for controlling said port having a by-pass therethrough, combined with adjustable means independent of said valve for regulating the flow of fluid through said port, separate adjustable means cooperating with said by-pass for regulating the flow of a continuous stream through the port, and a common means for locking both of said regulating means in adjusted positions.

7. A stop-cock formed with a port and containing a valve for controlling said port, combined with an adjustable screw-valve threaded into the cock adapted to choke the flow of a stream through said port, a by-pass through the first mentioned valve opening at one end into said port, an adjustable needle valve threaded longitudinally in said screw-valve to regulate the flow of a continuous stream through said by-pass and port, and a common means for locking both the screw-valve and the needle valve in adjusted positions.

8. A stop-cock formed with a port and containing a valve for controlling said port, combined with an adjustable screw-valve threaded into the cock adapted to choke the flow of a stream through said port, a by-pass through the first mentioned valve opening at one end into said port, an adjustable needle valve threaded longitudinally in said screw valve to regulate the flow of a continuous stream through said by-pass and port, a common means for locking both the screw valve and the needle valve in adjusted positions, and a removable cap to cover the ends of said valves and hold the locking means in engagement therewith.

9. A stop-cock formed with a port and containing a valve for controlling said port having a by-pass therethrough, combined with an adjustable screw-valve threaded into the cock to choke the flow of a stream through said port, an adjustable needle valve to regulate the flow of a continuous stream through said by-pass, both valves having slotted heads, a bar mounted on the cock adapted to engage said heads to hold the valves in adjusted positions, and a cover removably mounted on the stop-cock for inclosing said heads and the bar.

In testimony whereof we have hereunto set our hands in presence of two subscribing witnesses.

PHILIP MUELLER.
ANTON C. SCHUERMANN.

Witnesses:
LEONARD F. McKIBBEN,
CATHERINE E. McKEOWN.